(12) United States Patent
Cajias et al.

(10) Patent No.: US 11,391,595 B2
(45) Date of Patent: Jul. 19, 2022

(54) METHOD, APPARATUS, AND COMPUTER PROGRAM PRODUCT FOR UPDATING A MAP DATABASE

(71) Applicant: HERE GLOBAL B.V., Eindhoven (NL)

(72) Inventors: Raul Cajias, Berlin (DE); Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 152 days.

(21) Appl. No.: 16/664,372

(22) Filed: Oct. 25, 2019

(65) Prior Publication Data

US 2021/0123762 A1  Apr. 29, 2021

(51) Int. Cl.
| | |
|---|---|
| G01C 21/36 | (2006.01) |
| G06F 16/29 | (2019.01) |
| G06T 17/05 | (2011.01) |
| G01C 21/00 | (2006.01) |

(52) U.S. Cl.
CPC ....... *G01C 21/367* (2013.01); *G01C 21/3673* (2013.01); *G01C 21/3676* (2013.01); *G06F 16/29* (2019.01); *G06T 17/05* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 7,962,281 | B2* | 6/2011 | Rasmussen | G09B 29/10 340/995.14 |
| 8,243,080 | B2* | 8/2012 | Opala | G06F 3/14 345/428 |
| 8,369,264 | B2 | 2/2013 | Bracket et al. | |
| 8,880,589 | B2 | 11/2014 | Becker et al. | |
| 9,026,615 | B1* | 5/2015 | Sirton | H04N 19/593 709/217 |
| 9,654,937 | B2* | 5/2017 | Addepalli | H04Q 9/00 |

(Continued)

OTHER PUBLICATIONS

Jomrich et al., "Dynamic Map Update Protocol for Highly Automated Driving Vehicles", In Proceedings of the 3rd International Conference on Vehicle Technology and Intelligent Transport Systems (VEHITS 2017), pp. 68-78.

(Continued)

*Primary Examiner* — Aniss Chad
*Assistant Examiner* — Mahmoud M Kazimi
(74) *Attorney, Agent, or Firm* — Ditthavong, Steiner & Mlotkowski

(57) ABSTRACT

A method, an apparatus, and a computer program product for updating a map database are disclosed herein. The method comprises identifying a bounding box specifying a region of a map and obtaining a plurality of map area identifiers and the corresponding map area content based on the bounding box. The method may further include generating a bloom filter, wherein the bloom filter encodes a plurality of digests based on the plurality of map area identifiers and the corresponding map area content and transmitting a map update request comprising the generated bloom filter. The method may further include receiving map update data for at least a portion of the plurality of map area identifiers and the corresponding map area content and updating the map database based on the received map update data.

20 Claims, 9 Drawing Sheets

(56) References Cited

U.S. PATENT DOCUMENTS

| | | | | |
|---|---|---|---|---|
| 2008/0176583 A1* | 7/2008 | Brachet | ............... | G01S 5/0236 |
| | | | | 455/456.3 |
| 2012/0173606 A1* | 7/2012 | Becker | ............... | G01C 21/3667 |
| | | | | 709/203 |
| 2015/0264554 A1* | 9/2015 | Addepalli | ............... | H04W 8/26 |
| | | | | 370/328 |

OTHER PUBLICATIONS

Murray, "Map Visualization Developer's Guide", retrieved on Oct. 25, 2019 from https://docs.oracle.com/en/database/oracle/oracle-database/18/jimpv/map-visualization-servers.html#GUID-0D2CF483-95C0-45D0-B4E8-5A4578741A63, pp. 1-75.

\* cited by examiner

METHOD, APPARATUS, AND COMPUTER PROGRAM PRODUCT FOR UPDATING A MAP DATABASE

TECHNOLOGICAL FIELD

Example embodiments relate generally to navigation systems and more particularly relate to bloom filter enabled information exchange between a data service and a client for updating map data of a geographic region in a map version agnostic manner.

BACKGROUND

Generally, a mobile apparatus, such as a client, may submit a route request to a server, such as a network apparatus, a data service, or the like. This may trigger the server to generate the route and provide the route to the mobile apparatus. For example, the mobile apparatus may identify a starting segment and a target segment based on map data of a digital map stored in the mobile apparatus and provide the starting segment and the target segment to the server. The server receives the starting segment and the target segment, generates a route therebetween based on map data of a digital map stored in the server, and provides a list of segment identifiers to the mobile apparatus, where the segment identifiers correspond to the map data of the digital map stored by the server. However, problems can occur when the digital map stored by the mobile apparatus and the digital map stored by the server are different versions of the digital map. One solution is for the server to simply maintain multiple versions of the digital map. However, this solution is not viable for a digital map that updates frequently as the amount of memory needed to store and maintain all of the multiple versions of the digital map by the server is very large. Furthermore, performance and maintenance issues may arise due to the storage of a large number of map versions in the server. Additionally, this approach may not allow for rapid refreshing (e.g. weekly/daily updates) of the map data stored in the server.

BRIEF SUMMARY OF SOME EXAMPLE EMBODIMENTS

Various embodiments provide for updating a map database/local cache of the map database in a map version agnostic manner. Various embodiments provide for the transmission of map update data of a region in a bandwidth efficient manner. In various embodiments, map update data is updated data of some or all segments of a route/region. Various embodiments provide for encoding the client-side state of the map cache in a certain area using map area version agnostic identifiers and their corresponding map area content that are encoded into a bloom filter, such that the encoded identifiers and their corresponding map area content may be transmitted as a bit array to a data repository for further processing. In various embodiments, the identifiers may be map area identifiers and the bloom filter encodes map digests corresponding to each map area identifier.

A map area may correspond to a partition of a map. Each map area may be identified by a unique map area identifier and each map area may or may not have its corresponding map area content (also referred to as "map content" or "content"). In some example embodiments, the map area may be a map tile (i.e. a two-dimensional partition), a map cube (i.e. a three dimensional partition), or any other arbitrary partition of the digital map. Accordingly, the map area identifier may be referred to as TILE ID if the map area corresponds to a tile of the digital map or CUBE ID if the map area corresponds to a cube. The map area may include several map objects and features lying within its periphery. Accordingly, the map area content of a map area may include data regarding the map objects and features lying in the map area. For example, the map area content may include data regarding roads, road objects (such as road signs, dividers etc.), points of interest, traffic limits and the like.

For example, a mobile apparatus may have a mobile version of a digital map stored in memory of the mobile apparatus. A user or an application associated with the mobile apparatus may request for a route between a starting location and a target location.

In various embodiments, the route may be determined as an ordered list or set of route segments to be traversed from the mobile version starting segment to the mobile version target segment. The route segments may span across one or several map regions. As such, each map area identifier may correspond to one or more segment identifiers. For example, the ordered list or set of route segments may comprise an ordered list of segment identifiers that identify the route segments in the mobile version of the digital map. The route segments of the ordered list or set of route segments define a route segment set. To be able to provide on-the-fly accurate navigation assistance for the requested route, the mobile apparatus needs to have the latest version of the map area content corresponding to each map area identifier. Therefore, the mobile apparatus obtains map update data for updating the mobile version of the digital map.

For example, the mobile apparatus may determine a bounding box that encloses within it a region including the mobile version start location and the mobile version target location. The bounding box may be of any arbitrary shape, size, and in some cases where three-dimensional map data is utilized, it may be a three-dimensional shape. The mobile apparatus may obtain map area identifiers and their corresponding map area content for the bounding box from its local cache. For example, the map area identifiers and their corresponding content may be obtained for the region enclosed within the bounding box. The mobile apparatus may compute a plurality of digests based on the obtained map area identifiers and their corresponding map area content. For example, the mobile apparatus may code the obtained map area identifiers and their corresponding map area content using at least one coding function to compute the plurality of digests. The mobile apparatus may generate a bloom filter that encodes a plurality of digests corresponding to the map area identifiers and their respective map area content.

A bloom filter is a space-efficient probabilistic data structure that is used to test whether an element is a member of a set. False positive matches are possible, but false negatives are not. In other words, a query of a bloom filter returns either "possibly in set" or "definitely not in set." An empty bloom filter is a bit array of m bits all set to 0. One or more coding functions (e.g., k coding functions) are defined and used to map or code a set element to one of the m array positions. For example, to add a set element to the bloom filter, each of the k coding functions are used to identify k array positions. The k identified array positions are set to 1. To query the bloom filter to test whether a test element is in the set, the test element is coded using each of the k coding functions to determine k array positions corresponding to the test element. If any of the k array positions corresponding to the test element are 0, the test element is definitely not in the set. If all of the k array positions corresponding to the test element are in the set, then it is possible that the test element is a member of the set encoded by the bloom filter.

In an example embodiment, the mobile apparatus may initialize the bloom filter with an arbitrary size "m" (e.g. based on the number of map area identifiers corresponding to the bounding box). The mobile apparatus may utilize any suitable coding function to compute a mobile version map digest corresponding to each map area identifier. The mobile version map digest may be computed based on the map area identifier and its corresponding mobile version map area content. In various example embodiments, the mobile version map digest may be computed as a hash value H using a hash function HASH. The has function may be any hash function with reasonable collision safety. For example, in case the map area is a map tile, the mobile apparatus computes the mobile version map digest by hashing the TILE ID and mobile version content of the TILE ID.

The mobile apparatus generates an update request to request up to date map data corresponding to the map areas traversed by the route. The update request may comprise the bounding box 'BBOX' and the generated bloom filter 'BF'. In some embodiments, a content granularity level 'LEVEL' of each of the map areas in the bounding box may be predetermined for the exchange of map data. In some embodiments, the content granularity level 'LEVEL' of each of the map areas may be communicated as part of the update request. The mobile apparatus may then transmit the update request to a data repository such as a network apparatus.

For example, the network apparatus may have a network version of the digital map stored in memory of the network apparatus. The network apparatus receives the update request comprising the bounding box, and the bloom filter. In some embodiments, the update request may comprise the content granularity level 'LEVEL' of each of the map areas. The network apparatus may then use the bounding box and the network version of the digital map to decode the map areas in the bounding box. The network apparatus iterates the map area identifiers corresponding to the bounding box and extracts their corresponding network version map area content. The network apparatus may then compute a network version map digest for the referenced map area using the same coding function as used by the mobile apparatus. The network version map digest may be computed based on the map area identifier and its corresponding network version map area content. In various example embodiments, the network version map digest may be computed as a hash value H using a hash function HASH. For example, in case the map area is a map tile, the network apparatus computes the network version map digest by hashing the TILE ID and network version content of the TILE ID.

The network apparatus may then query if the network version map digest corresponding to a map area identifier is an element of the mobile version map digest set encoded in the bloom filter received in the update request. If the network version map digest for a particular map area identifier is found to be an element of the mobile version map digest set encoded in the bloom filter, the network apparatus skips that map area identifier and repeats the check for the next map area identifier in the bounding box. However, if the network version map digest for a map area identifier is not found to be an element of the mobile version map digest set encoded in the bloom filter, the network apparatus generates a response that includes the map area identifier and its corresponding network version map area content. This way, the network apparatus may perform a check for each map area identifier in the bounding box and may generate the map update data for the region represented by the bounding box. The network apparatus may transmit the generated map update data for the bounding box to the mobile apparatus for further processing.

For example, the mobile apparatus may receive the map area identifiers and corresponding network version map area content for those map area identifiers for which the map data has changed. Since the mobile version map digest and the network version map digest are based on the mobile version map area content and the network version map area content, respectively, only the content associated with network version map digests that does not satisfy the bloom filter, whose corresponding network version map area content is different than the corresponding mobile version map area content, is transmitted. That is, the map update data may only be transmitted for those map areas whose mobile version map data is different from the network version map data. This way, the map update data is transmitted/received in a bandwidth efficient manner.

The mobile apparatus may then store the received map area content of the corresponding map area identifiers in its offline cache memory for ready access. In other words, the offline cache of the mobile apparatus may be updated with the most up to date map data of the region. The mobile apparatus may then generate the navigation instructions and maneuvers using the most up to date map data of the region. In some example embodiments, the mobile apparatus may provide the route (e.g., via a user interface), control a vehicle such that the vehicle traverses the route, and/or use the route and/or other information/data provided in the map update response to perform one or more navigation functions. Some non-limiting examples of navigation functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. In this way, highly accurate and reliable navigation assistance may be provided to a user or an application that requested the route.

Thus, the bandwidth used to provide the map update request is minimized by encoding the map area (e.g., map area identifiers and their corresponding map area content) using a small bit array. Also, since the bloom filter enables a quick identification of the map areas for which the map area content is outdated at the mobile apparatus (i.e. the map areas for which map update data is to be sent), the bandwidth requirement for transmitting the map update response is optimized. This way, the requirement for maintaining several versions of the digital map at the network apparatus end is minimized.

Various embodiments of the present invention therefore provide technical solutions to the technical problems of the bandwidth efficient communication of map update request and map update response between apparatuses that have access to different versions of a digital map.

Various embodiments of the present invention provide for the determining and encoding (e.g., by a network apparatus) of map area (e.g., map area identifiers and their corresponding map area content) for obtaining the latest version of the digital map of a geographic region. The latest version of the digital map of the geographic region in turn allows the determining of the shortest distance routes, shortest expected travel time routes, multiple way point routes, routes with additional traffic information/data, routes to points of interest (POIs) identified in a POI search, parking cruise routes, and/or the like.

In an example embodiment, a route is requested between a starting point to a target point. The route may encompass one or more map areas identified by corresponding map version area agnostic identifiers. A bounding box enclosing the region through which the route passes may be defined and the map area version agnostic identifiers of all the map areas lying within the bounding box are iterated. Thus, a list of map areas through which the route passes and map content corresponding to those map areas is obtained by a mobile apparatus comprising a processor, a memory storing a local version of the digital map, and a communication interface. A bloom filter may then be generated by the mobile apparatus, where the bloom filter encodes a map area identifier and corresponding map area content for the one or more map areas in the bounding box. The bloom filter encodes a map digest corresponding to each map area in the bounding box. The bounding box and the bloom filter may be provided as a map update request such that a network apparatus receives the map update request. The content granularity level of map content of each map area in the bounding box may be optionally provided as part of the request. The network apparatus may obtain map area version agnostic identifiers corresponding to the bounding box. Further, the network apparatus may obtain the map area content corresponding to each map area version agnostic identifier and a map digest corresponding to each of the map area version agnostic identifier may be computed. Then, using the received bloom filter, it may be determined if the computed map digest for any map area satisfies the received bloom filter. Corresponding to those map areas for which the computed map digest does not satisfy the received bloom filter, the corresponding map area content stored at the network apparatus and the corresponding map area version agnostic identifiers may be added to a map update response. The map update response may then be provided such that the mobile apparatus receives it and may proceed to update its offline cache using the map update response.

According to a first aspect, a method for updating a map database is provided. In an example embodiment, the method may comprise identifying a bounding box specifying a region of a map, obtaining a plurality of map area identifiers and the corresponding map area content based on the bounding box, and generating a bloom filter. The bloom filter encodes a plurality of digests based on the plurality of map area identifiers and the corresponding map area content. The method further comprises transmitting a map update request comprising the generated bloom filter, receiving map update data for at least a portion of the plurality of map area identifiers and the corresponding map area content, and updating the map database based on the received map update data.

According to some example embodiments, generating the bloom filter further includes identifying whether at least a portion of the map area identifiers are pre-cached and coding in the bloom filter the digests corresponding to the pre-cached map area identifiers. The digests are computed using at least one coding function.

According to some example embodiments, the plurality of map area identifiers and the corresponding map area content represent data corresponding to one of map tiles or map cubes.

According to some example embodiments, the method further includes identifying a content granularity level associated with the map database for obtaining the plurality of map area identifiers and the corresponding map area content.

According to some example embodiments, the method further includes providing the updated map database to a navigation application.

According to some example embodiments, the updating the map database includes updating in the map database, data associated with at least the portion of the map area identifiers based on the map area content corresponding to at least the portion of the map area identifiers for which the map update data is received.

According to some example embodiments, a size of the bloom filter is based on a number of map area identifiers in the bounding box.

In yet another aspect, an apparatus for updating a map database is disclosed. The apparatus may comprise a non-transitory memory configured to store computer program code instructions and one or more processors configured to execute the computer program code instructions to: identify a bounding box specifying a region of a map, obtain a plurality of map area identifiers and the corresponding map area content based on the bounding box, generate a bloom filter, wherein the bloom filter encodes a plurality of digests based on the plurality of map area identifiers and the corresponding map area content, transmit a map update request comprising the generated bloom filter, receive map update data for at least a portion of the plurality of map area identifiers and the corresponding map area content, and update the map database based on the received map update data.

In yet another aspect, a computer program product may comprise a non-transitory computer readable medium having stored thereon, computer-executable instructions which when executed by a computer cause the computer to execute operations comprising identifying a bounding box specifying a region of a map, obtaining a plurality of map area identifiers and the corresponding map area content based on the bounding box, and generating a bloom filter. The bloom filter encodes a plurality of digests based on the plurality of map area identifiers and the corresponding map area content. The operations may further comprise transmitting a map update request comprising the generated bloom filter, receiving map update data for at least a portion of the plurality of map area identifiers and the corresponding map area content, and updating the map database based on the received map update data.

The foregoing summary is illustrative only and is not intended to be limiting in any way. In addition to the illustrative aspects, embodiments, and features described above, further aspects, embodiments, and features will become apparent by reference to the drawings and the following detailed description.

DETAILED DESCRIPTION

Figure 1:
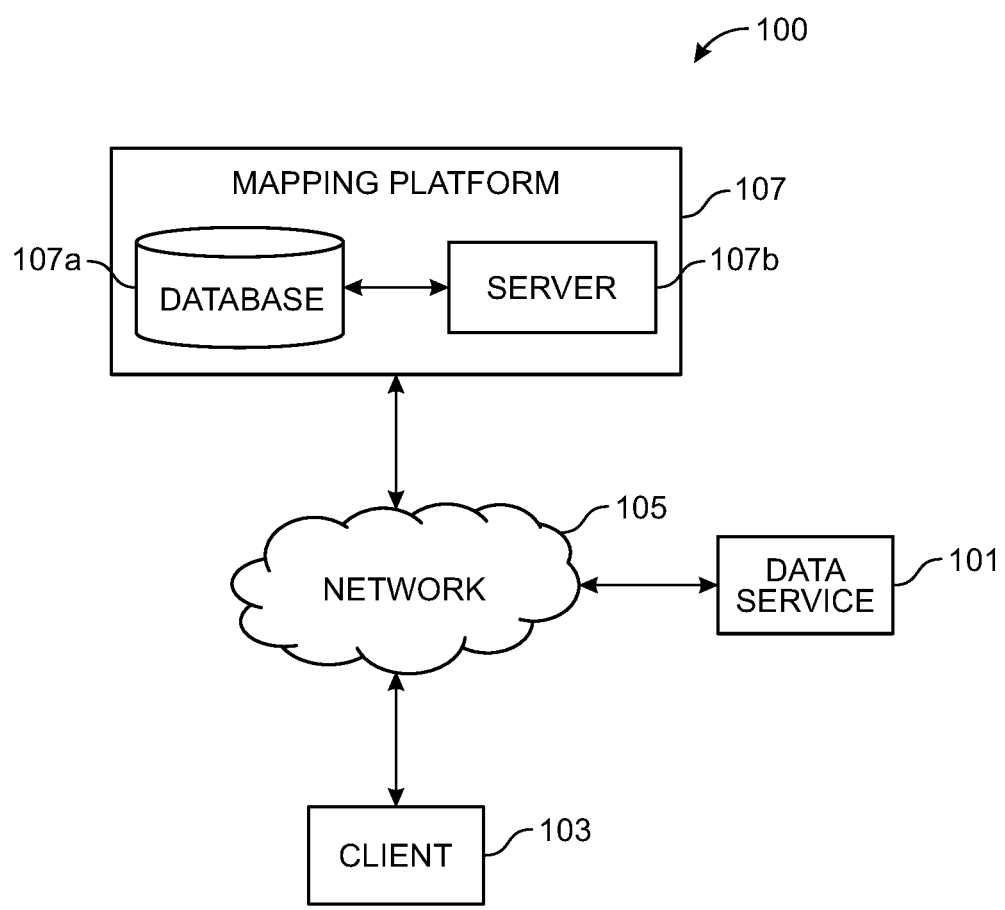
FIG. 1 illustrates a block diagram showing an example architecture of one or more example embodiments.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

FIG. 1 illustrates a block diagram 100 showing an example architecture of one or more example embodiments. The architecture may include a data service 101, a client 103, a mapping platform 107, and a network 105. In various embodiments, the data service 101 may be a backend server, a remotely located server or the like. In an embodiment, the data service 101 may be the server 107b of the mapping platform 107. In some embodiments, the data service may be an Original Equipment Manufacturer (OEM) cloud or a connection to the data service 101 may be established via the OEM Cloud. In various embodiments, the client 103 may be a vehicle navigation system, vehicle control system, a mobile computing device and/or the like. In an embodiment, the client 103 may be onboard a vehicle.

The database 107a of the mapping platform 107 may store map data. The server 107b may process incoming and outgoing communications to/from the mapping platform 107. The database 107a may store road segment data, node data, link data, link identification information, heading value records, point of interest (POI) data, or the like. The database 107a may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road segment data and the node data may represent a road network, such as used by vehicles, cars, trucks, buses, motorcycles, and/or other entities. Optionally, the database 107a may contain path segment and node data records, such as shape points or other data that may represent pedestrian paths, links or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 107a may also store data about the POIs and their respective locations in the POI records. The database 107a may additionally store data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the database 107a may include event data (e.g., traffic incidents, construction activities, scheduled events, unscheduled events, accidents, diversions etc.) associated with the POI data records or other records of the database 107a. Optionally or additionally, the database 107a may store 3D building maps data (3D map model of objects) of structures surrounding roads and streets.

The database 107a may be maintained by a content provider e.g., a map developer. By way of example, the map developer may collect geographic data to generate and enhance the database 107a. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used to generate map geometries.

The database 107a may be a master database stored in a format that facilitates updating, maintenance, and development. For example, the master database or data in the master database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by client such as the client 103, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received database in a delivery format to produce one or more compiled navigation databases.

As mentioned above, the database 107a may be a master geographic database. In some embodiments, a local offline available copy of the database 107a may be stored in the client 103 as a client-side database and may represent a compiled navigation database that may be used in or with end user devices (e.g., the client 103) to provide navigation and/or map-related functions. For example, the database 107a may be used with the client 103 (103a and/or 103b) to provide an end user with navigation features. In such a case, the database 107a may be downloaded or stored on the client 103.

The server 107b may comprise processing means and communication means. For example, the processing means may comprise one or more processors configured to process requests received from the client 103 and/or the data service 101. The processing means may fetch map data from the database 107a and transmit the same to the client 103 and/or the data service 101 in a format suitable for use by the client 103 and/or the data service 101. In one or more example embodiments, the mapping platform 107 may periodically communicate with the client 103 via the processing means to update a local cache of the map data stored on the client 103. Accordingly, in some example embodiments, the map data may also be stored on the client 103 and may be updated based on periodic communication with the mapping platform 107.

The mapping platform 107 may be communicatively coupled to the client 103a and/or the data service 101, via the network 105. The client 103 may be any user accessible device such as a mobile phone, a smartphone, a portable computer, and the like that is portable in itself or as a part of another portable/mobile object such as a vehicle. In some example embodiments, the client 103 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In this context, the user may be an autonomous or semi-autonomous vehicle. The client 103 may comprise processing means such as a central processing unit (CPU), storage means such as onboard read only memory (ROM) and random access memory (RAM), acoustic sensors such as a microphone array, position sensors such as a GPS sensor, orientation sensors such as gyroscope, motion sensors such as accelerometer, a display enabled user interface such as a touch screen display, and other components as may be required for specific functionalities of the client 103. Additional, different, or fewer components may be provided. For example, the client 103 may be configured to execute and run mobile applications such as a messaging application, a browser application, a navigation application, and the like.

The network 105 may be wired, wireless, or any combination of wired and wireless communication networks, such as cellular, Wi-Fi, internet, local area networks, or the like. In one embodiment, the network 105 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

Although, the data service 101 is shown as separate from the mapping platform 107, in some example embodiments, it may be implemented along with or as a part of the mapping platform 107. Hereinafter, the data service 101 and the mapping platform 107 would mean the same entity unless specified otherwise.

Figure 2A:
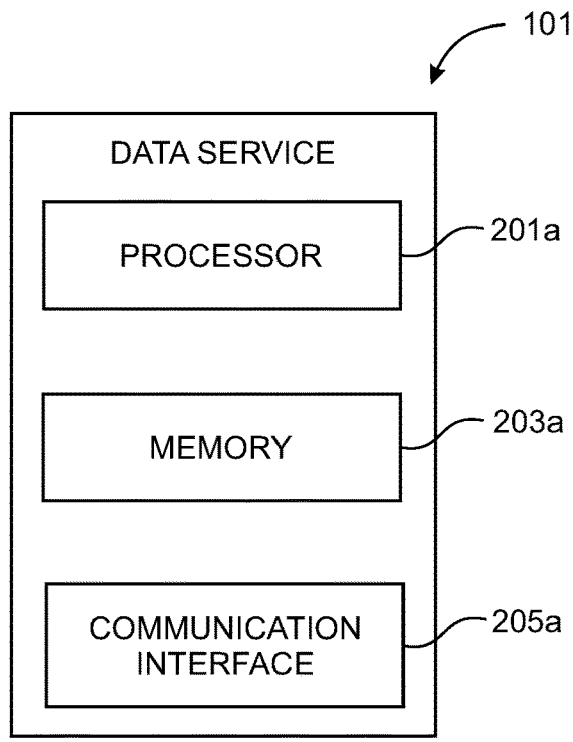
FIG. 2A illustrates a block diagram of a data service for generating map update data, in accordance with one or more example embodiments.

FIG. 2A illustrates a block diagram of the data service 101 for generating map update data, in accordance with one or more example embodiments. The data service 101 may include a processing means such as at least one processor 201a, storage means such as at least one memory 203a, and a communication means such as at least one communication interface 205a. The processor 201a may retrieve computer program code that may be stored in the memory 203a for execution of the computer program code instructions.

Figure 2B:
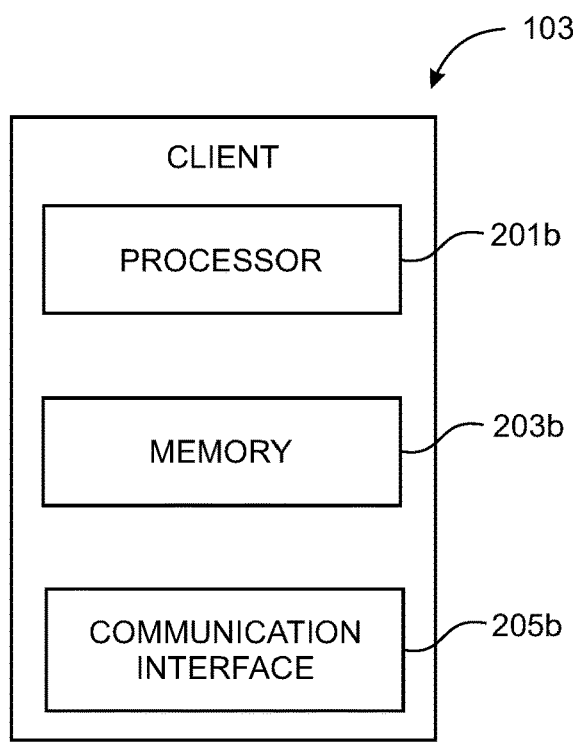
FIG. 2B illustrates a block diagram of a client for updating the map database, in accordance with one or more example embodiments.

FIG. 2B illustrates a block diagram of the client for updating the map database, in accordance with one or more example embodiments. The client 103 may include a processing means such as at least one processor 201b, storage means such as at least one memory 203b, and a communication means such as at least one communication interface 205b. The processor 201b may retrieve computer program code instructions that may be stored in the memory 203b for execution of the computer program code instructions.

The processors 201a and 201b may be embodied in a number of different ways. For example, the processors 201a and 201b may be embodied as various hardware processing means such as coprocessors, microprocessors, controllers, digital signal processors (DSPs), processing elements with or without accompanying DSPs, or various other processing circuitries including integrated circuits such as, for example, ASICs (application specific integrated circuit), FPGAs (field programmable gate array), microcontroller units (MCU), hardware accelerators, special-purpose computer chips, or the like. As such, in some embodiments, the processors 201a and 201b may include processing cores configured to perform independently. A multi-core processor may enable multiprocessing within a single physical package. Additionally, or alternatively, the processors 201a and 201b may include one or more processors configured in tandem via the bus to enable independent execution of instructions, pipelining and/or multithreading.

Additionally, or alternatively, the processors 201a and 201b may include processors capable of processing large volumes of workloads and operations to provide support for big data analysis. In an example embodiment, the processors 201a and 201b may be in communication with memories 203a and 203b, respectively via buses for passing information among components of structure 100. The memories 203a and 203b may be non-transitory and may include, for example, one or more volatile and/or non-volatile memories. In other words, for example, the memories 203a and 203b may be electronic storage devices (for example, a computer readable storage medium) comprising gates configured to store data (for example, bits) that may be retrievable by a machine (for example, a computing device like the processors (201a and/or 201b). The memories 203a and 203b may be configured to store information, data, content, applications, instructions, or the like, for enabling the apparatus to carry out various functions in accordance with an example embodiment of the present invention. For example, the memories 203a and 203b may be configured to buffer input data for processing by the processors 201a and 201b respectively. As exemplarily illustrated in FIG. 2A and FIG. 2B, the memories 203a and 203b may be configured to store instructions for execution by the processors 201a and 201b respectively. As such, whether configured by hardware or software methods, or by a combination thereof, the processors 201a and 201b may represent entities (for example, physically embodied in circuitry) capable of performing operations according to an embodiment of the present invention while configured accordingly. Thus, for example, when the processors 203 and 303 are embodied as ASICs, FPGAs or the like, the processors 201a and 201b may be specifically configured hardware for conducting the operations described herein. Alternatively, as another example, when the processors 201a and 210b are embodied as an executor of software instructions, the instructions may specifically configure the processors 201a and 201b to perform the algorithms and/or operations described herein when the instructions are executed. However, in some cases, the processors 201a and 201b may be processor specific devices (for example, mobile terminal or fixed computing devices) configured to employ an embodiment of the present invention by further configuration of the processors 201a and 201b by instructions for performing the algorithms and/or operations described herein. The processors 201a and 201b may include, among other things, clocks, arithmetic logic units (ALU) and logic gates configured to support operation of the processors 201a and 201b.

In some embodiments, the processors 201a and 201b may be configured to provide Internet-of-Things (IoT) related capabilities to users of the data service 101 and the client 103 respectively, where the users may be a traveler, a rider, a pedestrian, and the like. In some embodiments, the users may be or correspond to an autonomous or semi-autonomous vehicle. The IoT related capabilities may in turn be used to provide smart navigation solutions by providing real time updates to the users to take pro-active decision on turn-maneuvers, lane changes, overtaking, merging and the like, big data analysis, and sensor-based data collection by using the cloud based mapping system for providing navigation recommendation services to the users. The data service 101 and the client 103 may be accessed using the communication interfaces 205a and 205b respectively. The communication interfaces 205a and 205b may provide interfaces for accessing various features and data stored in the data service 101 and the client 103.

Figures 3A, 3B:
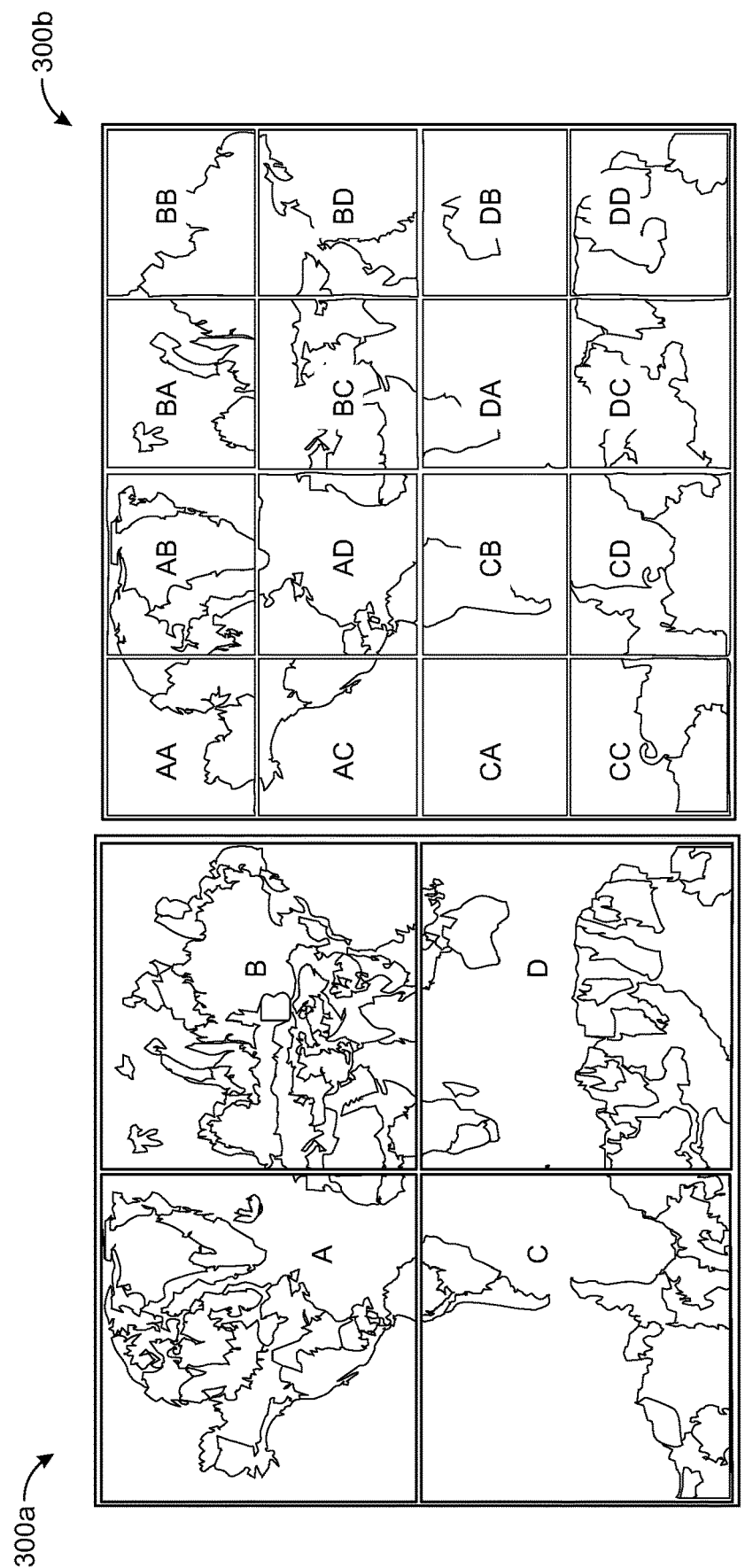
FIG. 3A illustrates an exemplary first level partition of a map into map areas, in accordance with one or more example embodiments.
FIG. 3B illustrates an exemplary second level partition of a map into map areas, in accordance with one or more example embodiments.

FIG. 3A illustrates an exemplary first level partitioning 300a of a map into map areas, in accordance with one or more example embodiments. In an embodiment, the data service 101 may store a data service version of a digital map in the memory 203a. For example, the data service version of the digital map may be obtained from the mapping platform 107 and stored in the data service 101. In an embodiment, the digital map may correspond to map data of the world. The map data of the world may correspond to satellite raster imagery, bitmap imagery, or the like. In various embodiments, the satellite rater imagery/bitmap imagery may include features and attribute data corresponding to the features. In some embodiments, the features may have a vector representation form. In an alternate embodiment, the digital map may correspond to 3D map data of the world. In various embodiments, the 3D map data corresponds to 3D map features (objects), defined as vectors, voxels, or the like. The data service 101 may store the digital map (i.e., the map data and/or the 3D map data) in multiple levels of granularity. In various embodiments, the multiple levels of granularity may correspond to zeroth ($0^{th}$) level of granularity to $n^{th}$ level of granularity. In an embodiment, n is a positive integer. In some embodiments, the level of granularity may be based on a resolution value of the digital map. In various embodiments, the zeroth level of granularity may correspond to the digital map of the whole world. Further, the zeroth level digital map may not be divided into sub-parts, which are known as partitions. In various embodiments, the $n^{th}$ level of granularity may be determined based on a desired application need. For example, $12^{th}$ level of granularity of the digital map may be utilized for a certain application, for instance, automotive/road maps in formats such as NDS (Navigation Data Standard).

A map area may correspond to a partition of the digital map. Each map area may be identified by a unique map area identifier and each map area may or may not have its corresponding map area content (also referred to as "map content" or "content"). In some example embodiments, the map area may be a map tile (i.e. a two-dimensional partition), a map cube (i.e. a three dimensional partition), or any other arbitrary partition of the digital map. Accordingly, the map area identifier may be referred to as TILE ID if the map area corresponds to a tile of the digital map or CUBE ID if the map area corresponds to a cube. The map area may include several map objects and features lying within its periphery. Accordingly, the map area content of a map area may include data regarding the map objects and features lying in the map area. For example, the map area content may include data regarding roads, road objects (such as road signs, dividers etc.), points of interest, traffic limits and the like.

Similarly, as described above, the client 103 may store a client version of the digital map in the memory 203b. For example, the client version of the digital map may be obtained from the mapping platform 107 and stored in the memory 203b. The client 103 may also store various levels of the client version of the digital map. In various embodiments, the data service version and the client version may be different versions of the digital map.

Considering a grid comprising $2^{\wedge}$ LEVEL*$2^{\wedge}$ LEVEL cells is put on the digital map, such that the digital map is divided in to $2^{\wedge}$ LEVEL*$2^{\wedge}$ LEVEL equal areas, each cell of the grid may indicate a map area or a map tile. For example, each cell of the grid covers a portion of area of the digital map. In an embodiment, a cell of the grid may have a shape of a square, a rectangle, a pentagon, or the like. In an embodiment, the LEVEL is used to derive the number of equal sized cells in the grid. In an example embodiment, LEVEL is a numbered value (e.g., natural numbers). To obtain a first level partition 300a of the digital map, the LEVEL is set to one. Then four cells (e.g., map tiles or map areas) A, B, C, and D may be obtained as shown in FIG. 3A. Each cell of the first level division 300a may cover millions of sq.km of area of the digital map. The amount of map data corresponding to each such cell may be huge, when accurate representation of a particular area corresponding to a cell is required (e.g., roads, buildings and the like). Accordingly, a suitable LEVEL has to be chosen to divide the digital map into equal map areas as per the requirement of accuracy in the map data. In an alternate embodiment, when the digital map is in 3D form (e.g., cube), then the digital map may be divided into $2^{\wedge}$ LEVEL*$2^{\wedge}$ LEVEL*$2^{\wedge}$ LEVEL cubes to obtain equal sized cubes. For example, when the LEVEL is set to value one, eight equal sized cubes may be obtained as the first level of the digital map (when the digital map is considered to be a 3D cube).

FIG. 3B illustrates an exemplary second level partition 300b of the map into map areas, in accordance with one or more example embodiments. As detailed in FIG. 3A, when the grid of $2^{\wedge}$ LEVEL*$2^{\wedge}$ LEVEL cells (with the LEVEL set two) is applied on the digital map, the second level partition 300b of the map (e.g., digital map) may be obtained. For example, the digital map may be divided into 16 cells (e.g., map area or map tile), when the LEVEL is set to a value two, as shown in FIG. 3B. Each cell of the second level division 300b may cover millions of sq.km of area of the digital map. Accordingly, the map data corresponding to each cell of the second level partition 300b may be huge. Therefore, the LEVEL may be set to a required value to obtain the cells covering minimum area with accurate information. For example, when the LEVEL is set to 16, each cell of the grid may cover thousands of sq.m of area of the digital map. In an embodiment, each cell of the grid may be referenced by a map area agnostic identifier such as a map area identifier. The map area identifier of a cell of the grid may be generated by considering the LEVEL of the grid, a row of the cell in the grid, and a column of the cell in the grid. For example, the map area identifier encodes the LEVEL of the grid, the row of the cell, and the column of the cell. In an embodiment, an algorithm may be used to generate the map area identifiers. The sequences for encoding the LEVEL of the grid, the row of the cell in the grid, and the column of the cell in the grid to generate the map area identifiers may be pre-defined or pre-established in the algorithm. The client 103 and data service 101 may use the same algorithm to generate the map area identifiers. In various embodiments, the map area identifiers are map area version agnostic identifiers and do not change between the client version and the data service version of the digital map.

Figure 3C:
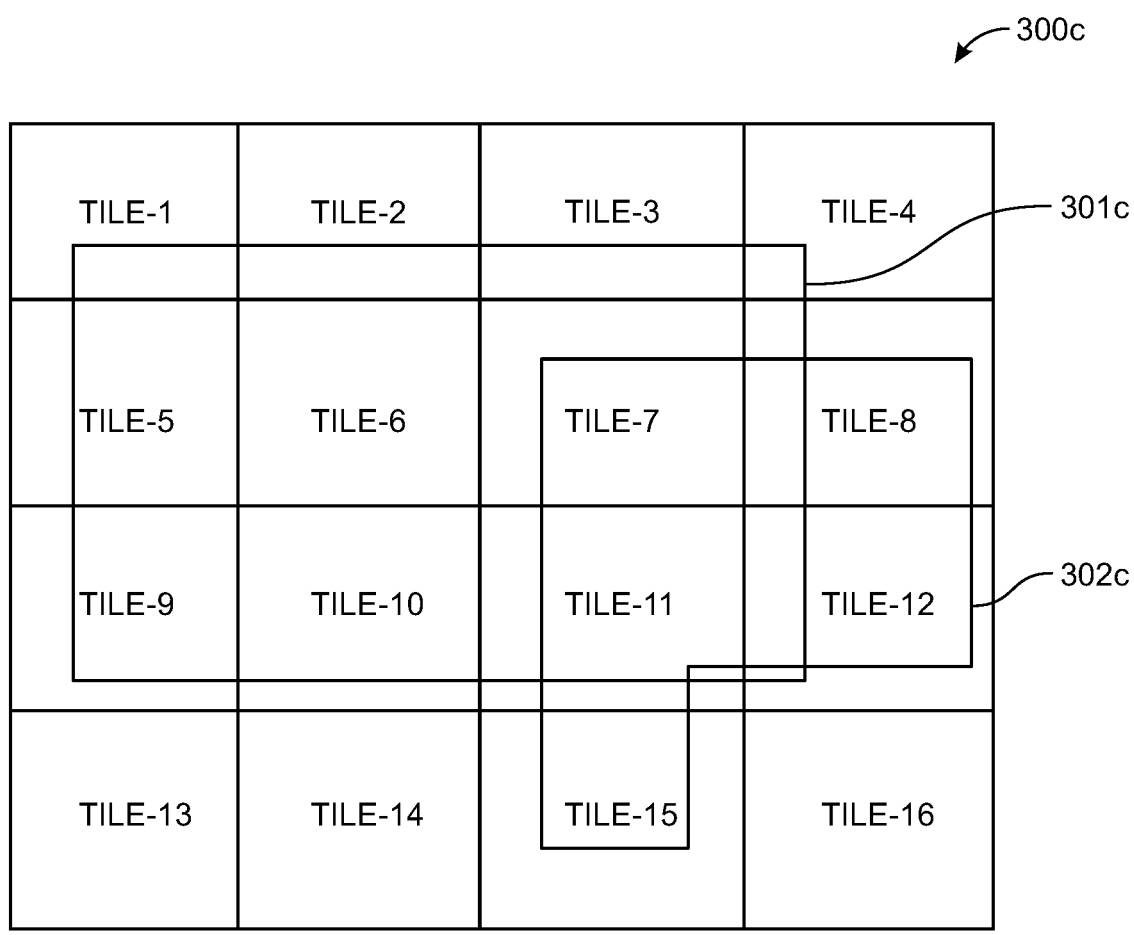
FIG. 3C illustrates an exemplary scenario for generation of bounding boxes for map areas, in accordance with one or more example embodiments.

FIG. 3C illustrates generation of bounding boxes for map areas 301c and 302c, in accordance with one or more example embodiments. In various embodiments, a bounding box corresponds to a map area. The bounding box may be a set comprising a plurality of map area identifiers. For example, a map area identifier may be an element of the set (e.g., bounding box), when at least a portion of the map area intersects with a region corresponding to the map area identifier. For example, the map area 301c may belong tile-1 to tile-12 (e.g., tiles 1, 2, 3, . . . 12) of the digital map 300c. Accordingly, a bounding box representing the map area 301c includes the map area identifiers of the tile-1 to tile-12. The map area 302c may belong to tile-7, tile-8, tile-11, tile-12, and tile-15. Accordingly, a bounding box representing the map area 302c includes the map area identifiers of the tile-7, tile-8, tile-11, tile-12, and tile-15. In various embodiments, a map tile range may be requested, which specifies a boundary of the bounding box. The bounding box includes all map area identifiers of the map areas that fall within and on the boundary of the bounding box. In some embodiments, the boundary of the bounding box (e.g., the map area corresponding to the bounding box) may have a polygonal shape or polyhedron (e.g. in case of 3D). According to some embodiments, the bounding box may be generated based on a route. In some embodiments, the boundary (or shape) of the bounding box may encompass the route.

The bounding box may be generated/defined based on a geographic area for which map update data is required. For example, a user or an application associated with the client may request for a route between a starting location and a target location. The geographical region encompassing the starting location and a target location may be determined. Further, map area identifiers that cover the geographical region are identified. The client may then determine a bounding box (e.g., a set) that comprises all map area identifiers that cover the geographical region. The bounding box may be of any arbitrary shape, size, and in some cases where three-dimensional map data is utilized, it may be a three-dimensional shape (polyhedron).

Figure 4:
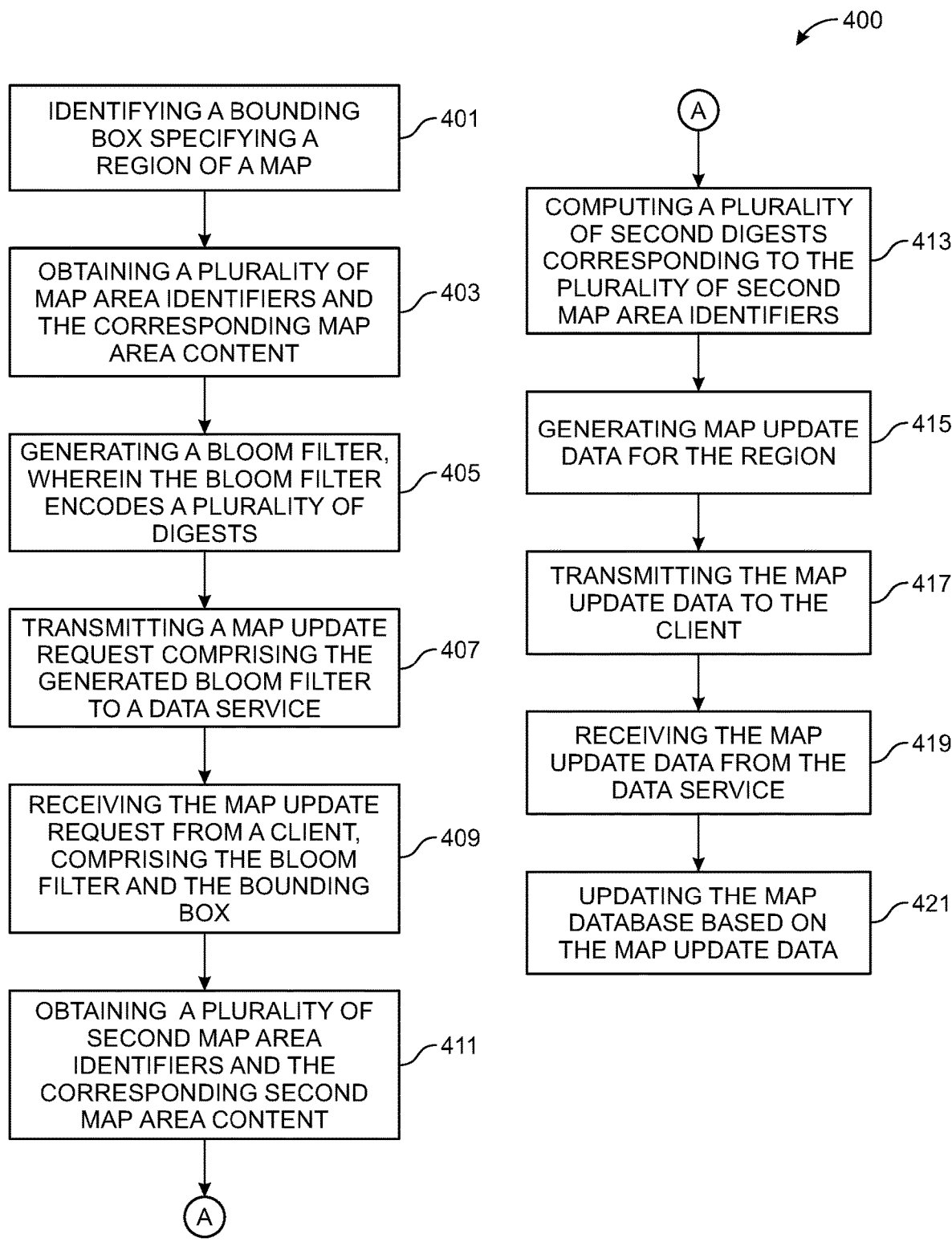
FIG. 4 illustrates a flow chart representing general overview of steps performed by the client and the data service for executing the map update protocol, in accordance with an example embodiment.

FIG. 4 illustrates a flow chart representing general overview of steps performed by the client 103 and the data service 101 for executing the map update protocol, in accordance with an example embodiment. Steps 401, 403, 405, 407,419, and 421 of process 400 may be performed by the client 103 for updating the map database. Steps 409, 411, 413, 415, and 417 of the process 400 may be performed by the data service for generating the map update data. The process comprises at step 401, identifying a bounding box specifying a region of a map; at step 403, obtaining a plurality of first map area identifiers and the corresponding first map area content, based on the bounding box. The process further comprises at step 405, generating a bloom filter, wherein the bloom filter encodes a plurality of digests, based on the plurality of first map area identifiers and the corresponding first map area content. Among the plurality of first map area identifiers, it is identified whether at least a portion of the plurality of first map area identifiers is pre-cached and only the digests corresponding to the pre-cached map area identifiers are coded into the bloom filter. The process further comprises at step 407, transmitting a map update request (e.g. to the data service 101) comprising the generated bloom filter and the bounding box. Additionally, or optionally, the map update request may further comprise the content granularity level of each of the map areas. At step 409, the process comprises receiving the map update request (e.g., from the client 103). The process further comprises at step 411, obtaining a plurality of second map area identifiers and the corresponding second map area content, wherein the plurality of second map area identifiers corresponds to the bounding box. At step 413, the process comprises computing a plurality of second digests corresponding to the plurality of second map area identifiers, based on the plurality of second map area identifiers and the second map content. In some embodiments, the plurality of second digests corresponding to the plurality of second map area identifiers may be computed in advance, for example, when the data service's map is updated. In such embodiments, the computing of the plurality of second digests at step 413 may include obtaining the pre-computed plurality of second digests. Irrespective of whether the plurality of second digests is pre-computed or computed on the fly, the process may further comprise at step 415, generating the map update data for the region, based on the plurality of second digests and the bloom filter.

Additionally, generating the map update data includes, at step 417, transmitting the generated map update data (e.g. to the client 103). At step 419, the process comprises receiving map update data for at least a portion of the plurality of first map area identifiers and the corresponding second map area content from the data service 101; and at step 421, updating the map database based on the received map update data.

The client 103 may perform the foresaid steps 419 and 421 to update the map database of the client 103. On implementing the process 400, the differences between the data service version and the client version of the digital map may be compensated. Additionally, the bandwidth used to provide the map update request is minimized by encoding the map area identifiers and corresponding map area content using a bloom filter, which is a small bit array relative to the size of the multiple map area identifiers involved in the request. Further, a navigation application may access the updated database of the client 103 to perform one or more navigation functions. Some non-limiting examples of navigation functions includes localization, route determination, speed determination, route guidance, lane level route guidance, vehicle speed and/or handling control, route and/or maneuver visualization, and/or the like.

Figure 5:
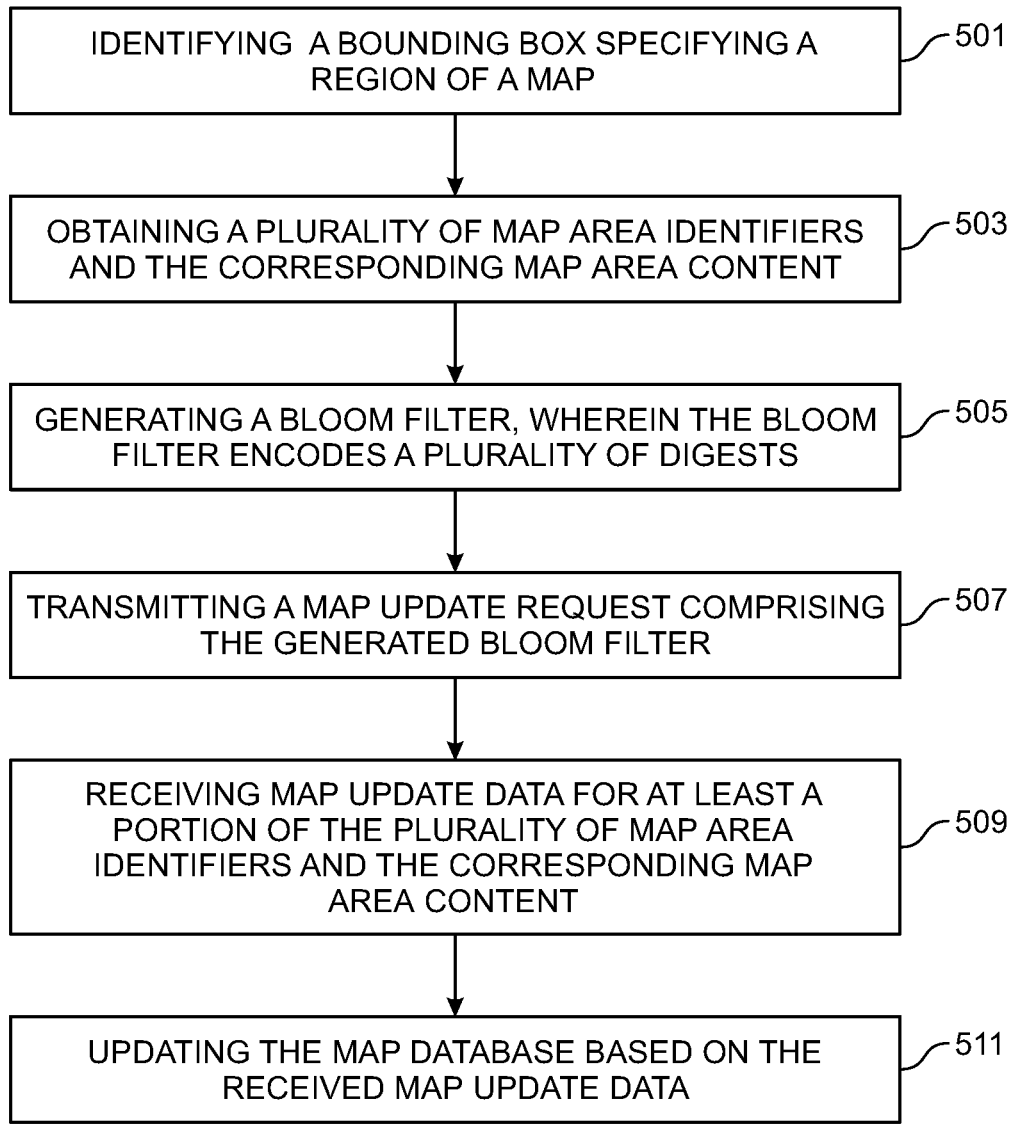
FIG. 5 illustrates a flow chart of operations performed by the client of FIG. 2B for updating the map database, in accordance with an example embodiment.

FIG. 5 illustrates a flow chart of operations performed by the client 103 of FIG. 2B for updating the map database, in accordance with an example embodiment. The client 103 may be triggered when an end user or an application associated with the client 103 requests for a route between a starting point and a target point. Starting at step 501, the client 103 may identify a bounding box specifying a region of a map. For example, the client 103 may identify the bounding box as the region extending between the starting point and the target point of a route. The bounding box may comprise one or more map areas (such as map tiles as detailed in FIG. 3C). For example, the bounding box may correspond to a set comprising a plurality of map area identifiers (e.g., map TILE IDs) of the digital map. In an embodiment, the user of the client 103 may specify or define the bounding box to the client 103. In an alternate embodiment, the user may provide a destination point to the client 103. The client 103 may determine a geographical region encompassing a current point (e.g., current location) and the destination point. The client 103 may determine the plurality of map area identifiers corresponding to the geographical region. For example, the client 103 may determine the bounding box specifying the geographical region between the current point and the destination point. According to some embodiments, the bounding box may comprise a venue, a street, a borough, a postal code, a city, a state, a country, a region of a continent, a continent, and/or the like.

At step 503, the client 103 may obtain the plurality of map area identifiers and the corresponding map area content for the map areas enclosed by the bounding box. For example, the client 103 may obtain the plurality of map area identifiers and the corresponding map area content, based on the bounding box. In an embodiment, the bounding box is the set comprising a plurality of map area identifiers. The client 103 may obtain map area content corresponding to each map area identifier of the bounding box from the client version of the digital map stored in the client 103.

At step 505, the client 103 may generate a bloom filter that encodes a plurality of digests. The client initializes the bloom filter of arbitrary size "m" (e.g., based on the number map area identifiers in the bounding box). For example, a bit array of m bits all set to 0 may be initialized as the bloom filter. The client 103 may utilize any suitable coding function to compute a client version map digest corresponding to each map area identifier. For example, a client version map digest may be computed based on the map area identifier and its corresponding client version map area content using any suitable coding function. Some non-limiting examples of the coding function include a deterministic hashing function such as a secure hash algorithm (SHA), MD5 message-digest algorithm and the like. In various example embodiments, the client version map digest may be computed as a hash value H using a hash function HASH. For example, in case the map area is a map tile, the client 103 may compute the client version map digest by hashing the TILE ID and client version content corresponding to the TILE ID. The plurality of computed client version digests is added to the initialized bloom filter.

At step 507, the client 103 may transmit a map update request comprising the bounding box and the generated bloom filter to the data service 101. In some embodiments, the map update request may further comprise the content granularity level of each map area in the bounding box. According to some embodiments, the map update request may comprise a message indicating the one or more coding functions that are used to compute the client version map digests.

At step 509, the client 103 may receive map update data for at least a portion of the plurality of map area identifiers and the corresponding map area content. For example, the client 103 may receive map update data from the data service 101, based on the map update request transmitted at step 507. In an embodiment, the map update data may comprise the data service version of the digital map (e.g., data service version of map area content) for at least a portion of the plurality of map area identifiers. For example, the map update data includes the data service version of map area content for one or more map area identifiers among the plurality of map area identifiers (e.g., the plurality of map area identifiers obtained at step 503). In some example embodiments, the map update data may be empty, where the version of the digital map at the client and the data service are same, the map update data may be empty and the client 103 may receive a notification indicating that the client version of digital map is up-to-date.

At step 511, the client may update the map database based on the received map update data. For example, the client 103 may update its offline cache based on the map update data received at step 509. The client 103 may update the client version of the digital map to the server version of the digital map. For example, the client version of the digital map stored in the memory 203b may be updated to the data service version of the digital map.

Figure 6:
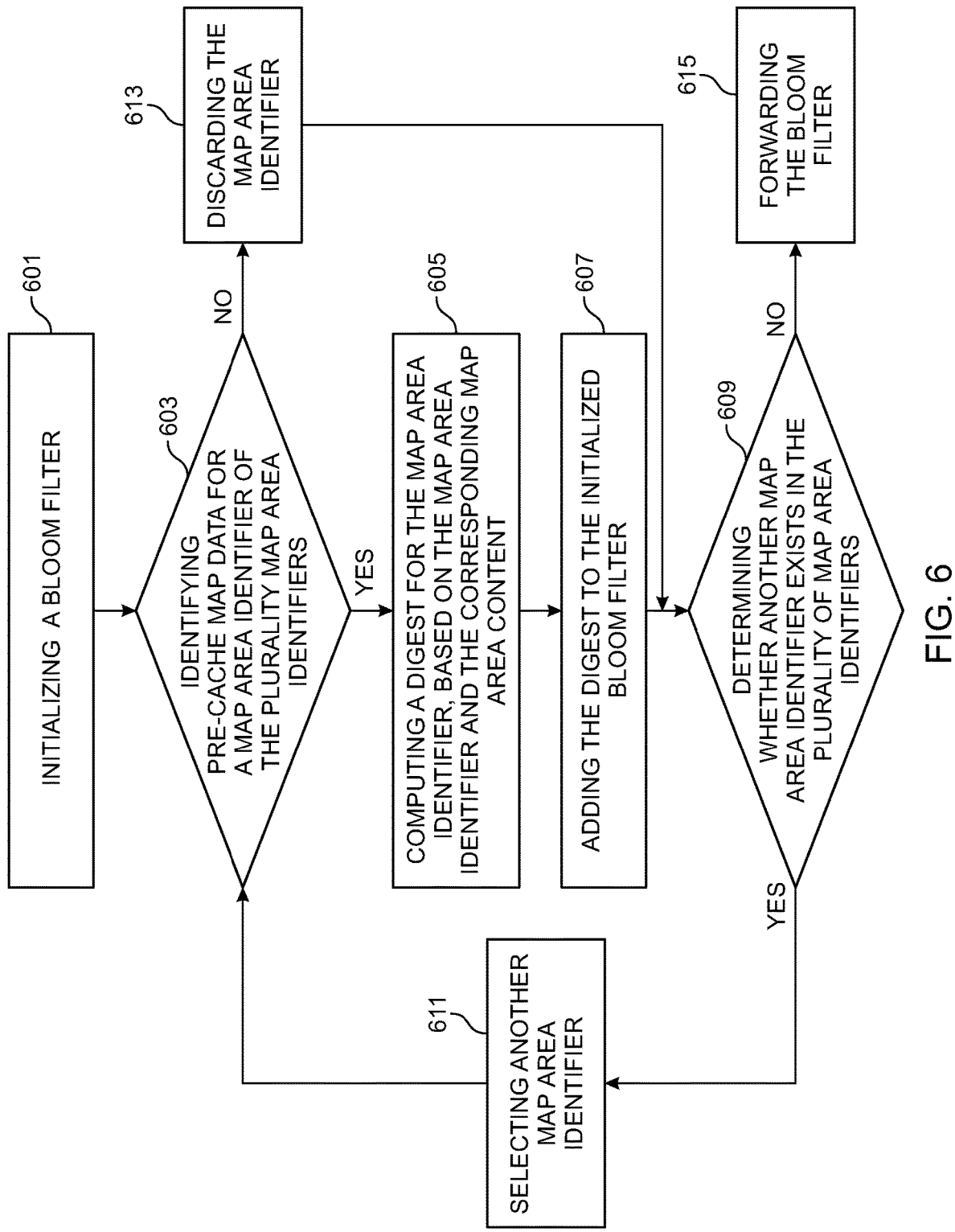
FIG. 6 illustrates a flow chart of operations performed by the client of FIG. 2B for generating a bloom filter, in accordance with an example embodiment.

FIG. 6 illustrates a flow chart of operations performed by the client of FIG. 2B for generating a bloom filter, in accordance with an example embodiment. At step 601, the client initializes a bloom filter. For example, the client 103 may initialize the bit array of m bits all set to 0. Size of the bloom filter (e.g., "m") is determined based on the number of map area identifiers in the bounding box. For example, the client 103 initialize the bit array of size m bits, such that the bloom filter (e.g., bit array) encodes the map area identifiers in the bounding box and their corresponding map area content (e.g., the plurality of digests). In general, a bloom filter is a space-efficient probabilistic data structure that is used to test whether an element is a member of a set. False positive matches are possible, but false negatives are not. In other words, a query of a bloom filter returns either "possibly in set" or "definitely not in set." An empty bloom filter is a bit array of m bits all set to 0. One or more coding functions (e.g., k coding functions) are defined and used to map or code a set element to one of the m array positions. For example, to add a set element to the bloom filter, each of the k coding functions are used to identify k array positions. The k identified array positions are set to 1. To query the bloom filter to test whether a test element is in the set, the test element is coded using each of the k coding functions to determine k array positions corresponding to the test element. If any of the k array positions corresponding to the test element are 0, the test element does not satisfy the bloom filter and test element is definitely not in the set. If all of the k array positions corresponding to the test element are in the set, then the test element satisfies the bloom filter and it is possible that the test element is a member of the set encoded to by the bloom filter.

At step 603, the client may identify pre-cache map data for a map area identifier of the plurality of map area identifiers. In an embodiment, the client may identify the pre-cache map data of the map area identifier in the bounding box from the client version of digital map stored in the client 103. For example, the client 103 selects the map area identifier in the bounding box and determines whether the map data (e.g., client version of the digital data) corresponding to the map area identifier exists (e.g., as the pre-cache). If the client 103 identifies that pre-cached map data for an identifier is present, it continues with the process at step 605, else the control passes to step 613.

If the client 103 identifies the pre-cached map data corresponding to the map area identifier, then at step 605, the client computes a digest for the map area identifier, based on the map area identifier and the corresponding map area content. The client 103 may code the map area identifier and the corresponding map data (e.g., map area content) using one or more coding functions to compute the digest for the map area identifier. In an example embodiment, the one or more coding functions include one or more hashing functions. For example, the one or more coding functions may include a deterministic hashing function such as a secure hash algorithm (SHA), MD5 message-digest algorithm, and/or the like.

At step 607, the client 103 adds the digest to the initialized bloom filter. In an embodiment, the initialized bloom filter is the bit array of m bits. The map area identifier and the corresponding map area content (e.g., the map data corresponding to the map area identifier) may be coded with k coding functions to compute k coded versions of the map area identifier and the corresponding map area content (e.g., the digest). In an example embodiment, k is an integer. The computed k coded versions are added to the bloom filter. For example, the k coded versions are used to identify k bit array positions. The k identified array positions are set to 1.

At step 609, the client 103 determines whether another map area identifier exists in the plurality of map area identifiers in the bounding box. If the client 103 determines another map area identifier in the bounding box, the process may continue with step 611, else with step 615.

At step 611, the client 103 selects another map area identifier in the bounding box and the process is repeated for the next map area identifier.

At step 603, if the pre-cached map data corresponding to a map area identifier does not exists, then the control passes to step 613 where the map area identifier is discarded. The process continues with step 609. At step 609, the client may again determine whether another map area identifier exists in the bounding box. If the client 103 has iterated with all map area identifiers of the bounding box, then there does not exists another map area identifier in the bounding box. The process continues with step 615.

At step 615, the client forwards the bloom filter to a map update request generation module operating on and/or being executed by the client 103.

Figure 7:
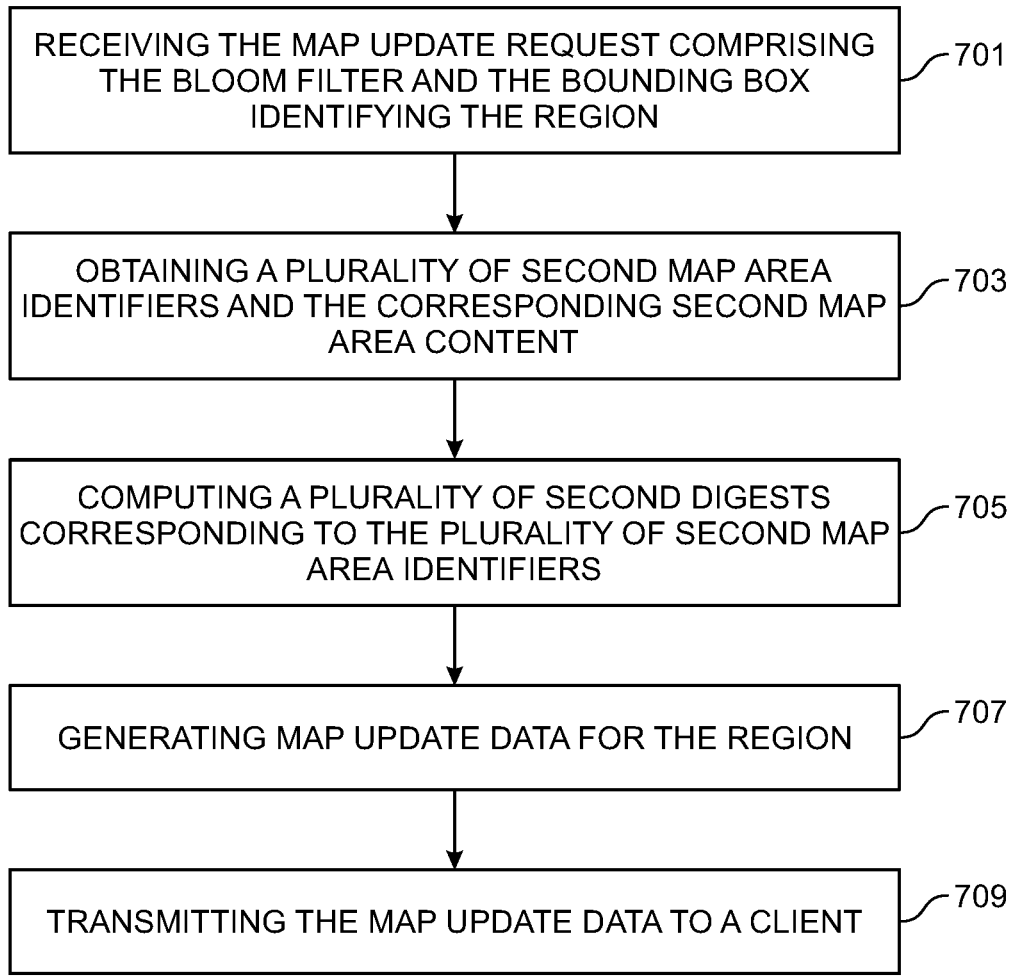
FIG. 7 illustrates a flow chart of operations performed by the data service of FIG. 2A for transmitting the map update data, in accordance with an example embodiment.

FIG. 7 illustrates a flow chart of operations performed by the data service 101 of FIG. 2A for transmitting the map update data, in accordance with an example embodiment. The data service 101 is triggered when a map update request is received. Starting at step 701, the data service 101 receives the map update request comprising the bloom filter and the bounding box identifying the region. In some embodiments, the map update request may further comprise the content granularity level of each map area in the bounding box. In an embodiment, the bloom filter in the map update request may encode a plurality of client version digests (e.g., the plurality of digests described in FIG. 5). The bounding box in the map update request may comprise a plurality of map area identifiers (e.g., the plurality of map area identifiers described in FIG. 5). In another embodiment, the map update request may additionally contain the LEVEL to determine the content granularity level of the digital map used to generate the bounding box.

At step 703, the data service 101 obtains the plurality of second map area identifiers and the corresponding data service version map area content using the bounding box and the data service version of the digital map. In various embodiments, the map area identifiers may not change between the client version of the digital map and the data service version of the digital map.

At step 705, the data service 101 may compute a plurality of data service version map digests corresponding to the plurality of map area identifiers, based on the plurality of map area identifiers and the data service version map area content. For example, the data service 101 may code, using one or more coding functions, each of the plurality of map area identifiers and their corresponding data service version map area content to compute the plurality of data service version map digests (also referred as a plurality of second digests). In various example embodiments, the same coding function may be utilized at the client side and the data service side. In an example embodiment, the one or more coding functions include one or more hashing functions. For example, the one or more coding functions may include a deterministic hashing function such as a secure hash algorithm (SHA), MD5 message-digest algorithm, and/or the like. According to some embodiments, the plurality of data service version map digests may be pre-computed and stored in the data service 101. For example, the data service 101 may compute the data service version map digests, when the map data (i.e., data service version of the digital map) of the data service 101 gets updated.

At step 707, the data service 101 generates map update data for the region, based on the plurality of computed data service version digests and the received bloom filter. In an embodiment, the data service 101 may determine whether any data service version digest does not satisfy the received bloom filter. In response to determining that a data service version digest does not satisfies the bloom filter, the data service 101 may add the corresponding map area identifier of the data service version digest and the data service version map area content to a map update response. The map update data/response comprises one or more map area identifiers and their data service version map area content.

At step 709, the data service 101 transmits the map update data to the client 103. In various embodiments, the map update data may comprise at least a portion of the map area identifiers in the bounding box and the data service version map area content corresponding to the at least portion of map area identifiers.

Figure 8:
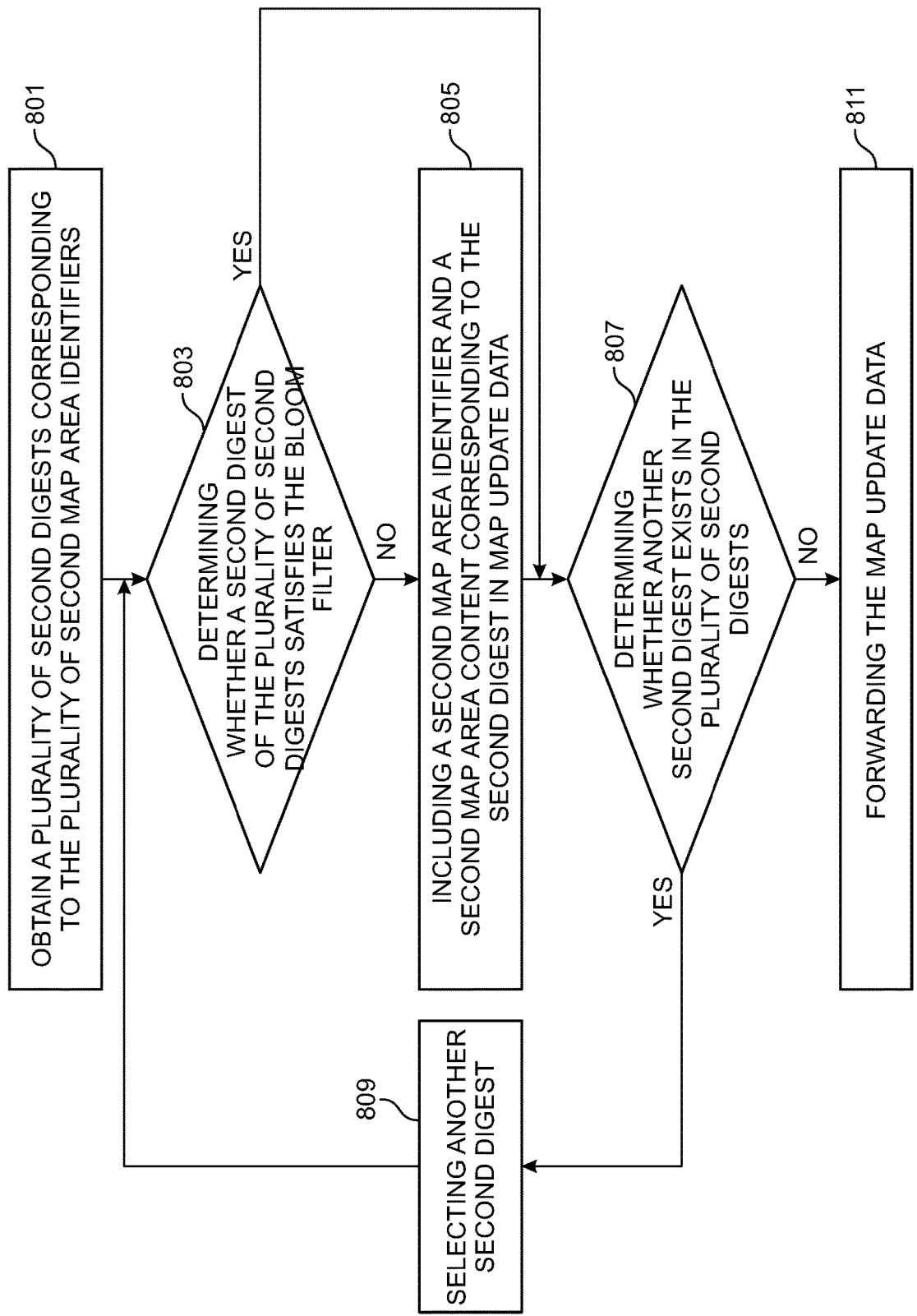
FIG. 8 illustrates a flow chart of operations performed by the data service of FIG. 2A for generating the map update data, in accordance with an example embodiment.

FIG. 8 illustrates a flow chart of operations performed by the data service 101 of FIG. 2A for generating the map update data, in accordance with an example embodiment. Starting at step 801, the data service 101 may obtain a plurality of data service version digests corresponding to the plurality of map area identifiers. As described previously in 705, the data service 101 may store the data service version digests. Accordingly, the plurality of data service version digests corresponding to the plurality of map area identifiers is obtained. At step 803, the data service 101 determines whether a data service version digest satisfies the bloom filter (i.e. is an element of the bloom filter).

If for some map area identifiers, the data service version digest does not satisfy the bloom filter, at step 805 the data service adds such map area identifiers and their corresponding data service version map area content to the map update response/data.

However, if at step 803 all the data service version digests satisfy the bloom filter, then the process continues with step 807. At step 807, the data service determines whether another data service version digest exists.

If another data service version digest exists, the data service at step 809, selects the data service version digest and the process continues with the step 803 again for the newly selected digest.

If, however, the data service 101 has iterated with all data service version digests and there exists no more data service version digest, the process continues with step 811. At step 811, the data service 101 forwards the map update data to a map update transmitting module operating on and/or being executed by the data service 101.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for updating a map database, the method comprising:
    identifying a bounding box specifying a region of a map to be updated;
    obtaining a plurality of map area identifiers and the corresponding map area content based on the bounding box;
    generating a bloom filter, wherein the bloom filter encodes a plurality of digests based on the plurality of map area identifiers and the corresponding map area content;
    transmitting, over a network, a map update request comprising the generated bloom filter to an update server;
    receiving map update data for at least a portion of the plurality of map area identifiers and the corresponding map area content; and
    updating, by one or more processors, the map database based on the received map update data.

2. The method of claim 1, wherein the plurality of map area identifiers and the corresponding map area content represent data corresponding to one of map tiles or map cubes.

3. The method of claim 1, wherein generating the bloom filter comprises:

identifying whether at least a portion of the map area identifiers are pre-cached; and coding in the bloom filter the digests corresponding to the pre-cached map area identifiers, wherein the digests are computed using at least one coding function.

4. The method of claim 1, wherein obtaining the plurality of map area identifiers and the corresponding map area content based on the bounding box comprises identifying a content granularity level associated with the map database.

5. The method of claim 1, further comprising providing the updated map database to a navigation application.

6. The method of claim 1, wherein the updating a map database comprises updating in the map database, data associated with at least the portion of the map area identifiers based on the map area content corresponding to at least the portion of the map area identifiers.

7. The method of claim 1, wherein a size of the bloom filter is based on a number of map area identifiers corresponding to the bounding box.

8. An apparatus for updating a map database, the apparatus comprising:

a memory configured to store computer-executable instructions; and one or more processors configured to execute the instructions to:

identify a bounding box specifying a region of a map to be updated;

obtain a plurality of map area identifiers and the corresponding map area content based on the bounding box;

generate a bloom filter, wherein the bloom filter encodes a plurality of digests based on the plurality of map area identifiers and the corresponding map area content;

transmit, over a network, a map update request comprising the generated bloom filter to an update server;

receive map update data for at least a portion of the plurality of map area identifiers and the corresponding map area content; and update the map database based on the received map update data.

9. The apparatus of claim 8, wherein the plurality of map area identifiers and the corresponding map area content represent data corresponding to one of map tiles or map cubes.

10. The apparatus of claim 8, wherein to generate the bloom filter, the one or more processors are further configured to:

identify whether at least a portion of the map area identifiers are pre-cached; and code in the bloom filter the digests corresponding to the pre-cached map area identifiers, wherein the digests are computed using at least one coding function.

11. The apparatus of claim 8, wherein to obtain the plurality of map area identifiers and the corresponding map area content based on the bounding box, the one or more processors are further configured to identify a content granularity level associated with the map database.

12. The apparatus of claim 8, wherein the one or more processors are further configured to provide the updated map database to a navigation application.

13. The apparatus of claim 8, wherein to update a map database, the one or more processors are further configured to update in the map database, data associated with at least the portion of the map area identifiers based on the map area content corresponding to at least the portion of the map area identifiers.

14. The apparatus of claim 8, wherein a size of the bloom filter is based on a number of map area identifiers corresponding to the bounding box.

15. A computer program product comprising a non-transitory computer readable medium having stored thereon computer executable instruction which when executed by one or more processors, cause the one or more processors to carry out operations for updating a map database, the operations comprising:

identifying a bounding box specifying a region of a map to be updated;

obtaining a plurality of map area identifiers and the corresponding map area content based on the bounding box;

generating a bloom filter, wherein the bloom filter encodes a plurality of digests based on the plurality of map area identifiers and the corresponding map area content;

transmitting, over a network, a map update request comprising the generated bloom filter to an update server;

receiving map update data for at least a portion of the plurality of map area identifiers and the corresponding map area content; and updating the map database based on the received map update data.

16. The computer program product of claim 15, wherein the plurality of map area identifiers and the corresponding map area content represent data corresponding to one of map tiles or map cubes.

17. The computer program product of claim 15, wherein for generating the bloom filter, the operations further comprise:

identifying whether at least a portion of the map area identifiers are pre-cached; and coding in the bloom filter the digests corresponding to the pre-cached map area identifiers, wherein the digests are computed using at least one coding function.

18. The computer program product of claim 15, wherein for obtaining the plurality of map area identifiers and the corresponding map area content based on the bounding box, the operations further comprise identifying a content granularity level associated with the map database.

19. The computer program product of claim 15, wherein for updating a map database, the operations further comprise updating in the map database, data associated with at least the portion of the map area identifiers based on the map area content corresponding to at least the portion of the map area identifiers.

20. The computer program product of claim 15, wherein a size of the bloom filter is based on a number of map area identifiers corresponding to the bounding box.

* * * * *